Feb. 27, 1923.

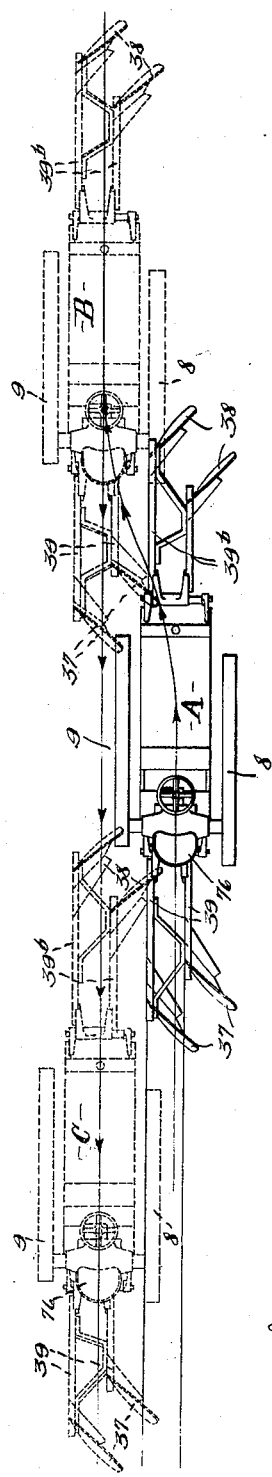

A. T. BROWN

TRACTOR PLOW

Filed Oct. 21, 1919

INVENTOR.
Alexander T. Brown.
BY
Parsons & Bodell
ATTORNEYS.

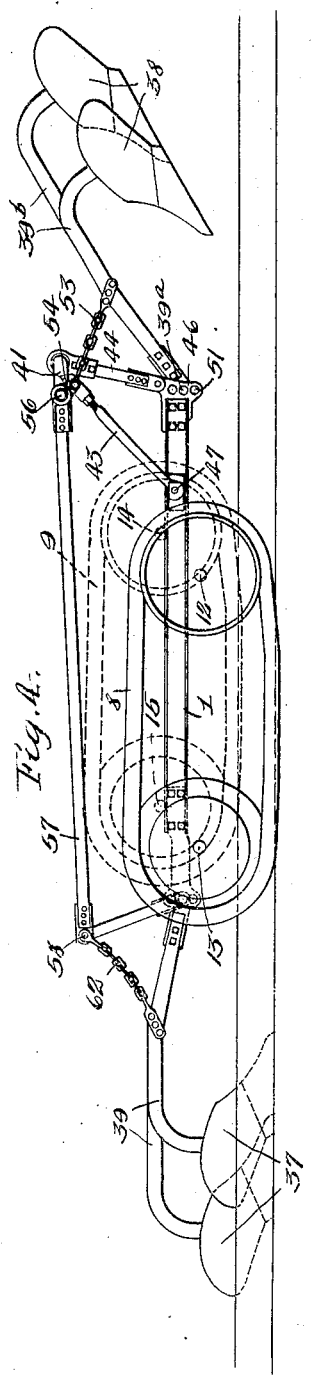
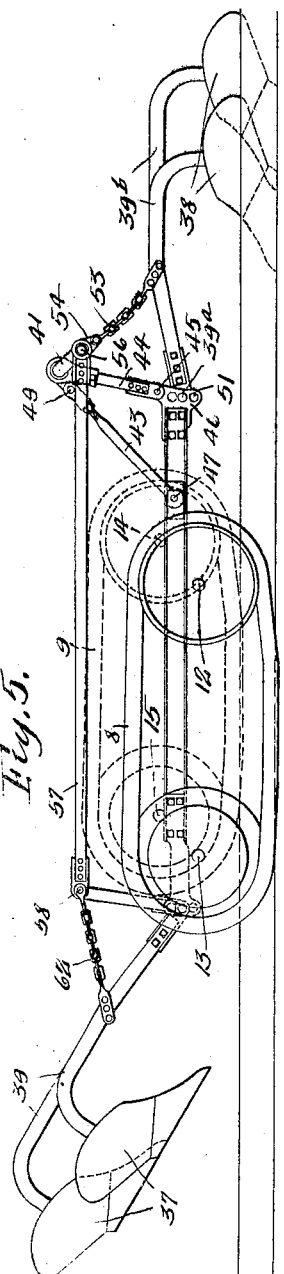
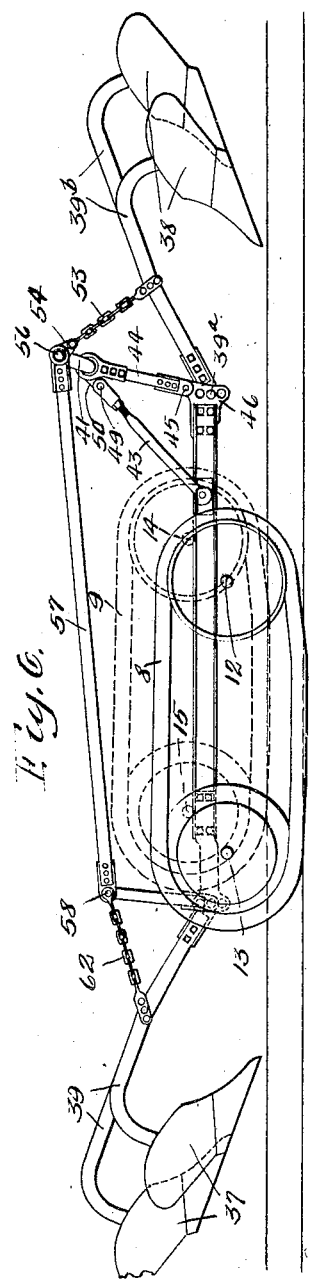

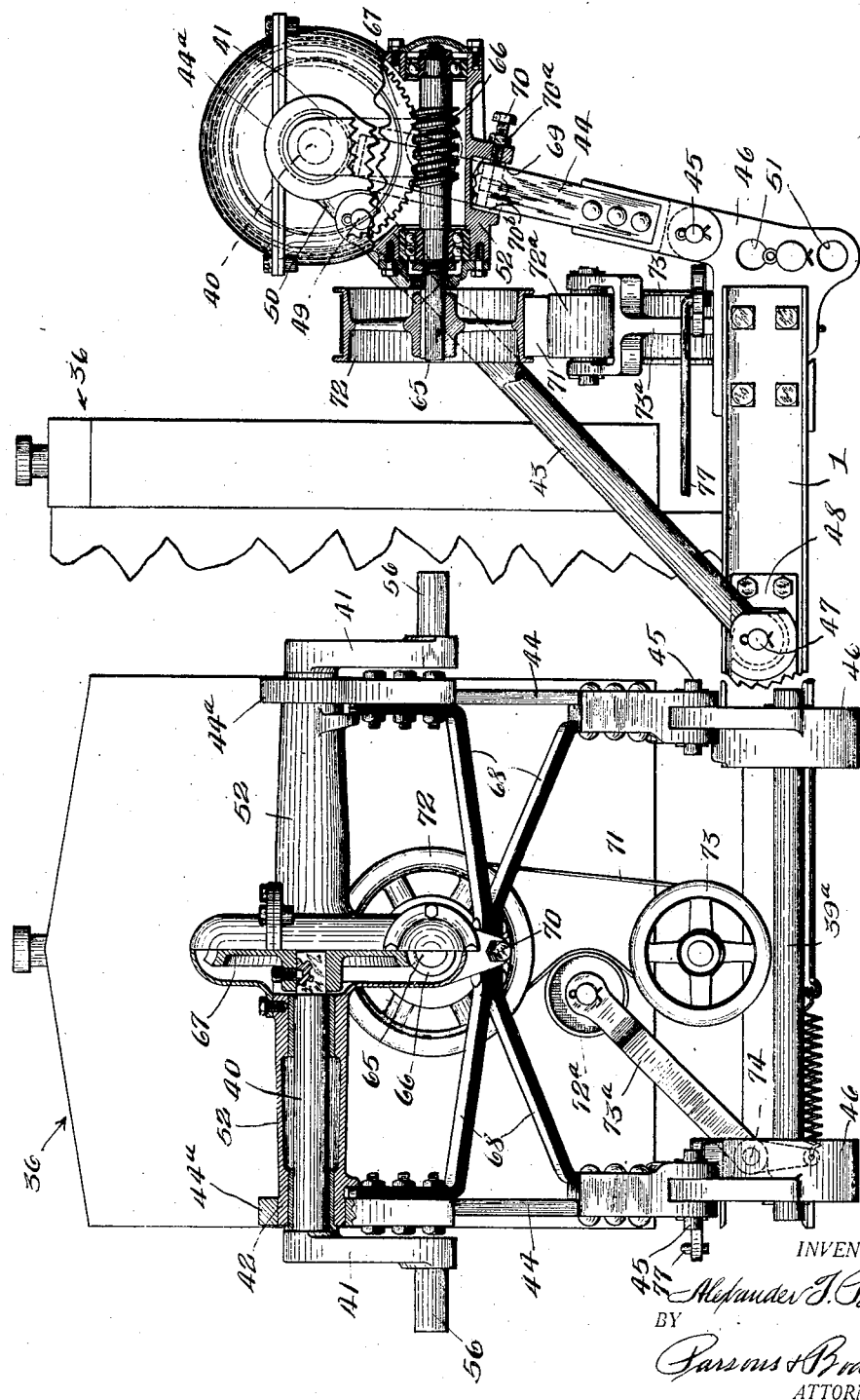

Feb. 27, 1923.
A. T. BROWN
TRACTOR PLOW
Filed Oct. 21, 1919
1,446,826
8 sheets-sheet 5
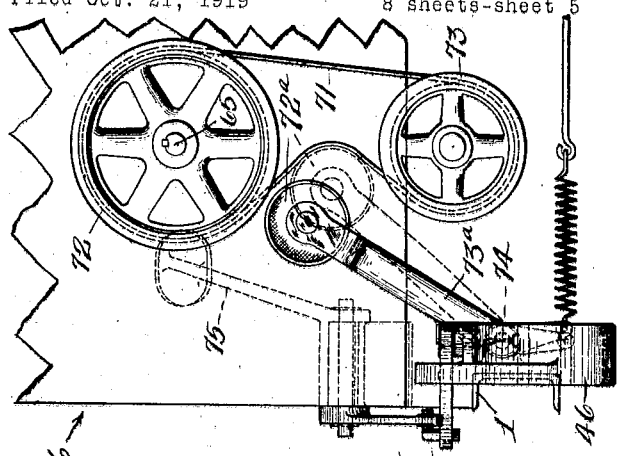
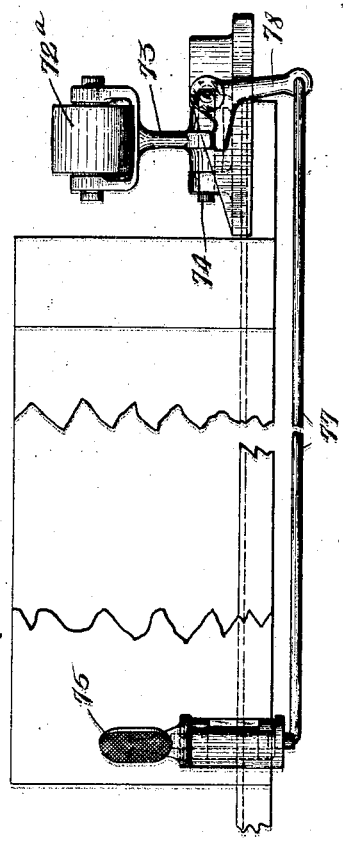
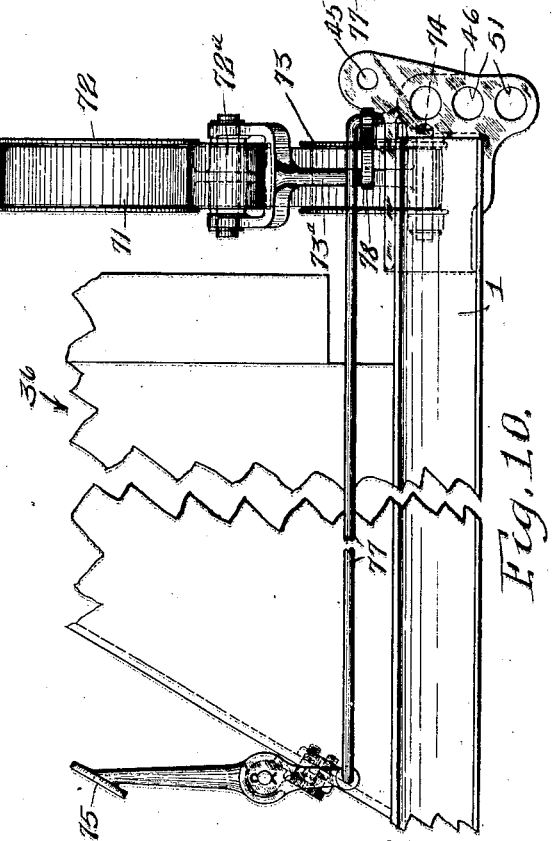
INVENTOR.
Alexander T. Brown.
BY
Parsons & Bradell
ATTORNEYS.

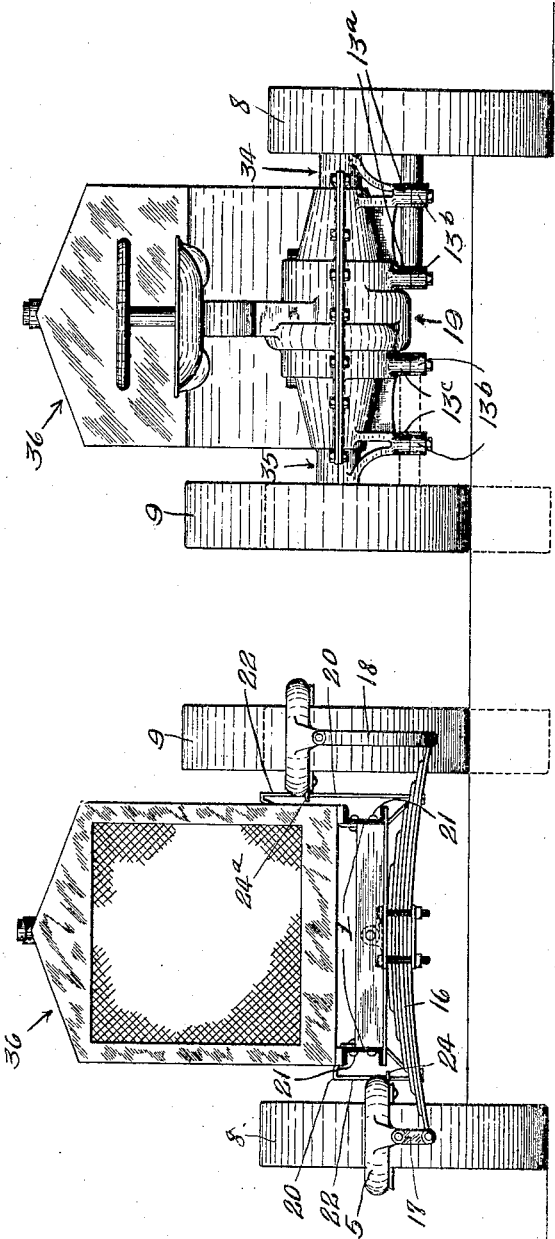

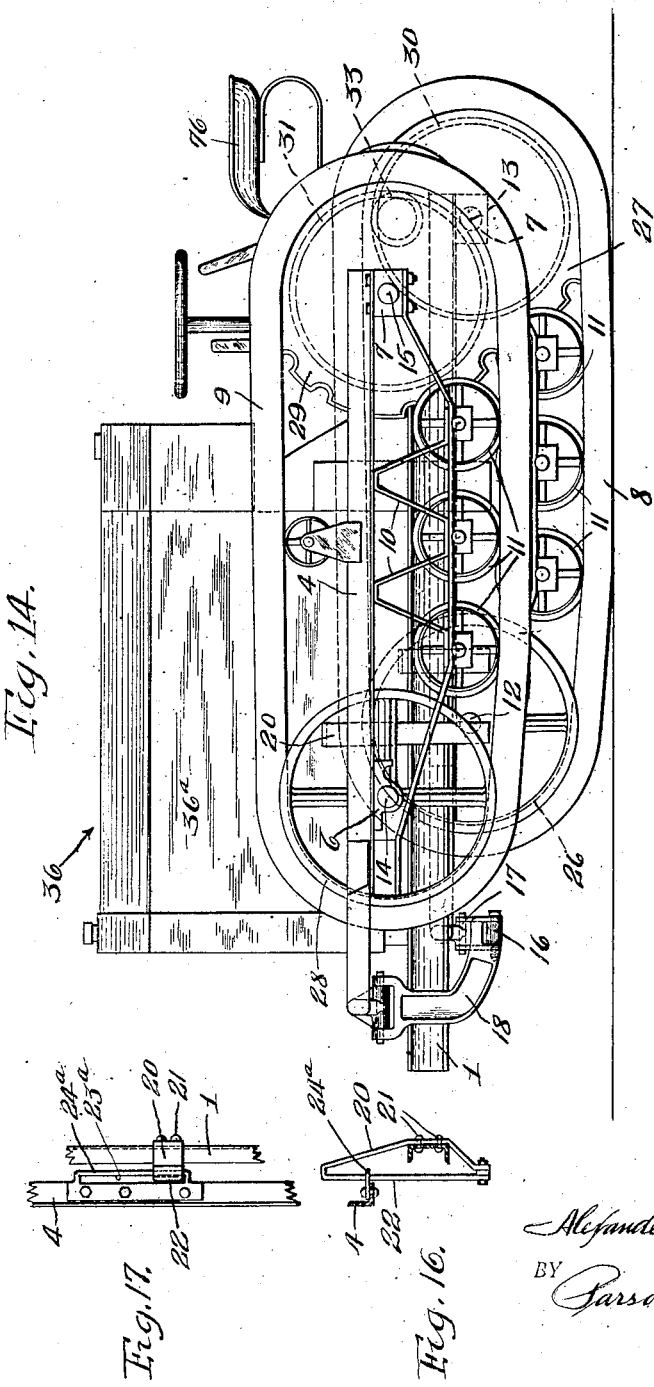

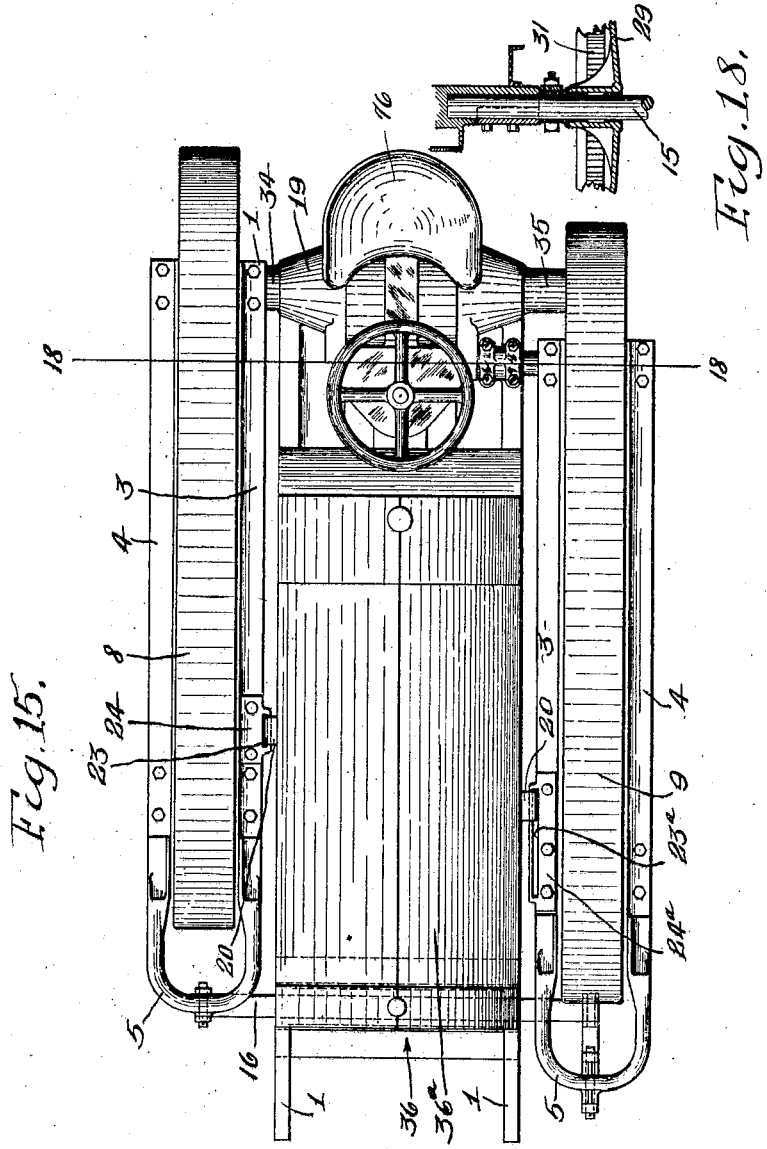

Patented Feb. 27, 1923.

1,446,826

UNITED STATES PATENT OFFICE.

ALEXANDER T. BROWN, OF SYRACUSE, NEW YORK.

TRACTOR PLOW.

Application filed October 21, 1919. Serial No. 332,218.

*To all whom it may concern:*

Be it known that I, ALEXANDER T. BROWN, a citizen of the United States, and a resident of Syracuse, in the county of Onondaga and State of New York, have invented a new and useful Tractor Plow, of which the following is a specification.

This invention relates to tractors or motor agricultural machines and has for its object a particularly simple and efficient arrangement of the implements, as plows, relatively to the plowing and to the frame or chassis of the machine and also a particularly simple and efficient means readily applicable to tractors for raising and lowering the implements, as plows. Other objects will appear throughout the specification.

The invention consists in the novel features and in the combinations and constructions hereinafter set forth and claimed.

In describing this invention, reference is had to the accompanying drawings in which like characters designate corresponding parts in all the views.

Figure 1 is a plan view of the tractor at different points in positioning at the end of a furrow embodying my invention, parts being omitted, two of the positions occupied thereby while positioning at the end of the furrow being shown in dotted lines.

Figure 2 is a side elevation thereof.

Figure 3 is a plan view of parts seen in Fig. 2.

Figures 4, 5 and 6 are side elevations, parts being omitted, Figure 4 illustrating the implements as the plows, at the rear end of the tractor lowered into operative position and those at the front end elevated; Figure 5 showing the implements at the front end lowered into operative position and those at the rear end elevated; and Figure 6 showing the implements at both ends in elevated position.

Figure 7 is a front elevation, partly in section, and parts being omitted, of the tractor showing a portion of the power transmitting connections for raising and lowering the implements.

Figure 8 is an elevation, partly in section, looking to the right in Fig. 7.

Figure 6:
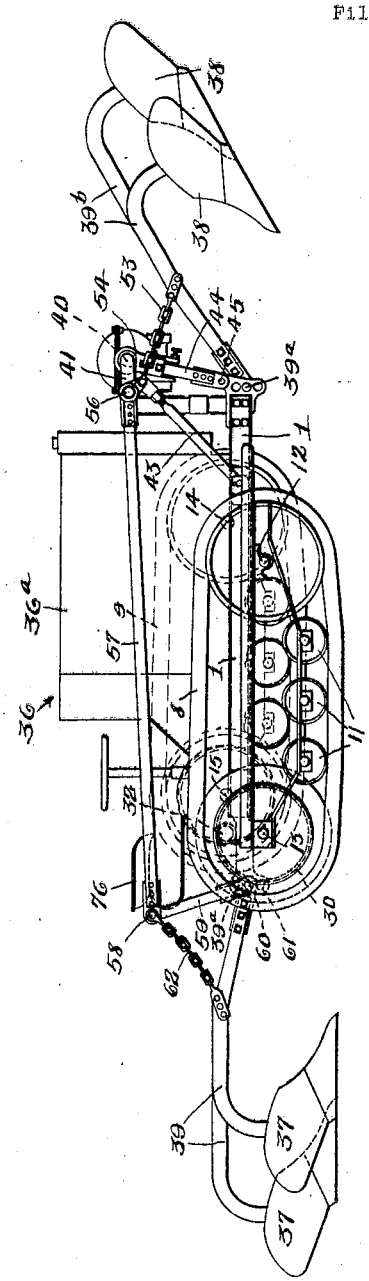

Figures 9, 10 and 11 are fragmentary views, showing the mechanism for controlling the raising and the lowering of the implements; Figure 9 being a plan view partly broken away; Figure 10 an elevation of parts seen in Figure 9; and Figure 11 an elevation looking to the left in Figure 10.

Figures 12, 13, 14 and 15 are respectively, front, rear and side elevations, and a plan view of the tractor with plows and mechanism for raising and lowering them, detached, but showing one tractor belt raised to keep machine level in plowing, for self steering and better traction.

Figure 16 is a detail view of the connections between one side sill of the tractor chassis and the truck frame supporting the raised tractor belt mechanism.

Figure 17 is a fragmentary plan of parts seen in Fig. 16.

Figure 18 is a fragmentary detail sectional view taken approximately on line 18—18, Fig. 15.

This invention comprises, generally, a tractor chassis having tractor wheels or belts on opposite sides thereof, implements, as plows, projecting or overhanging from the front and rear ends of the chassis frame, and means for raising the implements at either end and lowering those at the other, or for raising the implements at both ends.

The chassis includes a frame of any suitable form, size and construction, which comprises generally, side sills 1 and cross bars, truck frames and tractor belt mechanism supported by the truck frames.

Each truck frame comprises parallel bars 3, 4 connected at their front ends by a yoke 5, Figs. 12, 14, and 15, the bars 3, 4 supporting bearings 6, 7 for front and rear axles for the wheels around which the right and left tractor belts 8, 9 run. Each truck frame also includes framing 10 for supporting the idler wheels 11 which hold the lower runs of the belts straight.

The left hand tractor belt frame (considered when the observer is on the seat looking forwardly) is higher than the right hand as the left hand belt and always runs on the unplowed land, and the right hand belt runs in the furrow and is held by the furrow in its course so that it automatically steers the machine. The front and rear axles for the right tractor belt mechanism are designated 12 and 13 respectively and those for the left hand 14 and 15 respectively. The bearings 7 for the rear axles 13, 15 are carried by the chassis, and the front axles 12, 14 are carried in the bearings 6 which are supported by the bars 3, 4. The bars 3, 4 are spring supported at their front ends by a spring 16 which is connected to the yokes 5 by shackles 17, 18, the shackle 18 connected to the higher left hand truck frame being longer than the shackle 17.

The higher left hand tractor belt, truck and mechanism is also located slightly ahead of the lower right hand belt truck, and the rear axle 13 thereof is located directly below the driving mechanism located in the casing 19, Fig. 13, and the rear axle 15 in front of said mechanism. Thus the axles 13, 15 are located in different vertical and horizontal planes with respect to the driving shaft sections in the casing 19 for a purpose to be hereinafter described. The front axles 12, 14 are similarly located. The rear axle 13 is carried on the lower side of the right hand side sill or an extension thereof, and the rear axle 15 on the upper side of left hand sill or extension thereof. The rear axle 13 is clamped between bearing sections $13^a$, $13^b$, the lower sections $13^b$ being removable, and the axle 15 is interchangeable from its position shown into position indicated in dotted lines, Fig. 13 where it is held between similar bearings $13^c$, $13^d$.

The front portion of the truck frames are connected to the sills of the chassis to permit up and down movement during the action of the spring 16 by guides 20, Figs. 14, 15, 16 and 17 secured at 21 to the truck frames and having vertical portions as 22 moving through eyes or slots in the contiguous bracket, the vertical portion 22 of the right hand bracket, that is, the bracket at the right hand of the machine when looking forwardly from the seat moves through an eye or slot 23 in the bracket 24 mounted on the right hand sill 3, the eye or slot 23 substantially fitting the vertical portion 22. The slot $23^a$ in the bracket $24^a$ for the higher left hand belt are long enough to permit a forward movement of the adjacent guide 20 when the left hand belt is shifted to be on a level with the right hand belt.

26, 27 and 28, 29 are the front and rear sprocket wheels around which the tractor belts run mounted on the axles 12, 13 and 14, 15 respectively and the rear sprockets are formed with internal gears 30, 31 with which mesh pinions 32, 33 mounted on shaft sections 34, 35 extending within the casing 19.

The shaft sections 34, 35 are arranged in line and connected by the differential gearing in the casing 19 but owing to the fact that the axles 13, 15 for the wheels 27, 29 are arranged out of alinement, the pinions 32, 33 mesh with the internal gears 30, 31 of the wheels 27, 29 at relatively different points, although the shaft sections 34, 35 on which the pinions are mounted are arranged in alinement. As seen in Fig. 2 the pinion 32 meshes with the internal gear 30 directly above in a vertical radius of the axle 13 while the pinion 33 meshes with its internal gear 31 in rear of and along a horizontal radius of the axle 15.

36 designates the power plant as a whole, mounted on the chassis and including an internal combustion engine located under the hood $36^a$ and suitable power transmitting mechanism between the engine and the tractor wheels including the shaft sections 34, 35 and the differential gearing in the casing 19 connecting said sections.

The implements here shown as plows, or plow bodies 37, 38 carried by supports, as beams 39, $39^b$ movably connected to the frame 1 of the tractor and as here shown, the beams are pivoted at $39^a$ to brackets mounted on the ends of the sills of the frame 1.

The plows 37 and 38 are reversely arranged with respect to each other, that is, the plows 37 are constructed to turn right hand furrows and the plows 38 to turn left hand furrows and as here shown, there is a gang of two plows overhanging from each end of the frame 1.

The means for raising and lowering the plows 37, 38 is operable at will through connections with the power plant or crank shaft of the engine and as here shown, these connections comprise a rotary element as a drive shaft 40 located at one end, as the front end of the chassis in front of the power plant having cranks 41 at its opposite ends, connections between each crank and the front and rear plows, and means connectible at will to the engine, whereby the shaft 40 is moved about its axis.

The shaft 40 is here shown as mounted in bearings 42 carried by the upper ends of a pair of arms 43, 44 at each side of the front end of the frame, each arm 44 being pivoted at 45 to a bracket 46 mounted on the front end of one of the sills of the frame 1, each arm 44 having a bearing $44^a$ at its upper end around one of the bearings 42 for the shaft 40. Each arm 43 is pivoted at its lower end at 47 to a bracket 48 on the side sill of the chassis and has its upper end pivoted at 49 to an arm 50 on the bearing $44^a$. The arm 43 is located in the rear of the arm 44 and converges upwardly toward the arm 44. The brackets 46 have a plurality of pairs of openings 51 in any one pair of which the pivots $39^a$ of the plow beams 39, $39^b$ may be located.

The bearings 42 are formed at the opposite ends of a tubular casing 52 enclosing the shaft 40. The crank arms 41 are connected to the plows 37 or to the beams 39 thereof by means of suitable flexible power transmitting connections as cables 53, each cable having a link 54 at one end having a bearing on the crank pin 56 of one of the crank arms 41 and having its other end secured to the plow beam. The plows 37 at the rear end of the frame are operated from the same crank arms 41 as the plows at the front end through links 57 extending lengthwise of the chassis and having bearings at their front ends on the crank pins 56 and connected at their rear ends at 58 to the upper ends of the arms 59 which are pivoted at 60 to brackets 61 on the rear end of the frame to which brackets 61 are also pivoted, the plow beams 39 of the rear plows. The arms 59 are connected to the plows 37 by cables 62 similar to cables 53. Each pair of plow beams 39 or $39^b$ are fixed to a single bracket 63 or 64 having a bearing upon the corresponding pivots or shafts $39^a$ so that each pair of plows is raised and lowered as a unit.

The means for actuating the shaft 40 as here shown, comprises a driving element, as a shaft 65 having a worm 66 thereon which meshes with the driven worm wheel 67 mounted on the shaft 40, the shaft 65 being driven from the engine, as will be presently described. This shaft 65 is journaled in bearings formed in and suitably supported by the casing 52 and it is held from movement relatively to the shaft 40 by means of brace rods 68 connecting the arms 44, these rods extending through a passage 69 formed in the lower side of the casing 52. After the position of the casing 52 has been determined to line up the belt 71, the arms or rods 68 are secured to the casing by means of a set screw 70.

The shaft 65 is connected to the crank shaft of the engine by any suitable means here shown as a belt 71 running over pulleys 72 and 73 mounted respectively on the shaft 65 and the crank shaft of the engine and this belt is normally loose so that it transmits no power. It may be tightened at will by means of an idler $72^a$ coacting with the belt and carried by the arm $73^a$ mounted on a rock shaft 74 which is operable by a suitable pedal 75 carried by the frame within reach of the seat 76 and connected to the arm $73^a$ through suitable links and levers 77, 78.

In applying the plows and the raising and lowering mechanism to tractors the arms 43 and 44 with the brackets at the lower ends thereof are mounted on the side sills of the frame or extension thereof and the pulley 73 mounted on the crank shaft; the upper pulley 72 can be located in vertical alinement with the lower pulley 73 by swinging the arms 43 or 44 and the shaft 40 forwardly or rearwardly and then tightening the set screw 70 and lock nut $70^a$ on a shim of suitable thickness at $70^b$ to get vertical alinement; and the plow beams, or the brackets connecting the ends thereof are mounted on a shaft supported by the same brackets on which the arms 44 are mounted.

Tractors having tractor belts are usually steered by slowing or speeding up the belt on one side relatively to the belt on the other. When such tractors are pulling the torque reaction causes the front end of the tractor to lift up more or less.

Owing to the arrangement of the implements or plows at both ends of the tractor as provided by my invention, the implements out of the ground tend to counterbalance the reaction and hold one end of the tractor from lifting, and furthermore, owing to the arrangement of the tractor belts in different planes, the tractor stands level as one of the tractor belts runs in the furrow previously cut. Also, when plowing the tractor is self steering as the belt running in the furrow steers the tractor.

In operation, during the travel of the machine across the field, as to the right in Fig. 1 as indicated by the full lines at A, the rear plows 37 are lowered and the front plows 38 elevated and as the end of the furrow is reached, the tractor is turned to the left or upwardly in Fig. 1 into the position indicated in dotted lines at B at the right end of Fig. 1, so that the right hand tractor belt 8 will come on its way back, into the last furrow just cut. The plows 37 at the rear end of the tractor are elevated and the plows 38 at the front end at C lowered after the tractor starts back across the field and the plows 38 come to the end of the furrows turned by the plows 38 when in position A. As the plows 38 at the front end turn left hand furrows, the furrows now being cut by the plows 38 will be the same as those cut by the plows 37 during the preceding trip across the field. The plows are dropped as at C so that the furrows will be even at their ends.

In moving the tractor to and from the field and in manipulating it about the field, both front and rear plows are elevated into the position shown in Fig. 6.

Figure 5:
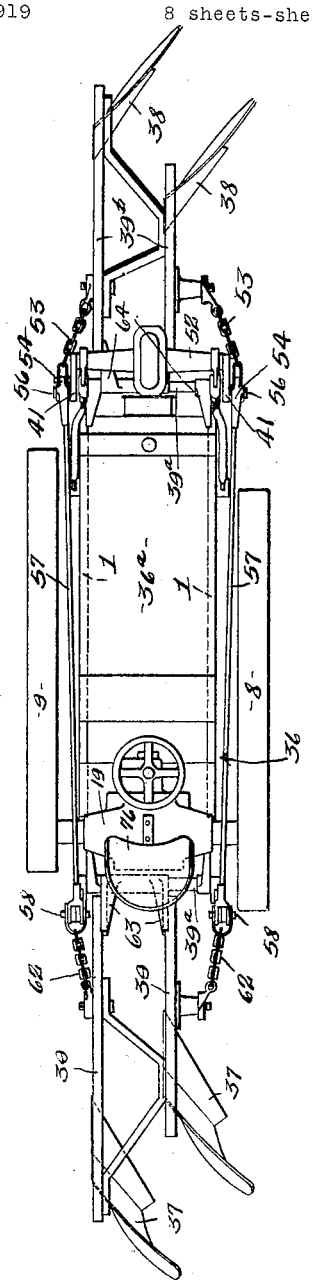

To elevate and lower the plows the operator depresses the pedal 75 to cause the idler 72 to tighten the belt 71 and act to clutch the worm shamt 65 to the crank shaft of the engine through the pulley 73, belt 71 and pulley 70. During the rotation of the worm shaft 65 the worm gear 67 is rotated, which in turn rotates the shaft 40. When the crank arms 41 are in one radial position, as shown in Fig. 4, the rear plows 37 are lowered into plowing position and the front plows 38 elevated. When the shaft 40 is rotated to carry the crank arms 41 into the position shown in Fig. 5, the plows 38 at the fronk end are lowered into plowing position and plows 37 at the rear end are elevated and when said shaft 40 is rotated to carry the crank arms 41 into the angular position shown in Fig. 6 the plows 37, 38 at both the front and rear ends are elevated above the ground. The seat may be swivelled to face front, rear or sidewise to suit the convenience of the operator.

When the plowing is completed and the tractor is to be used for other purposes or is to be driven along a road, the axles for the left hand tractor belt are shifted into the position shown in dotted lines, Figs. 12 and 13, a shackle similar to the shackle 17 being substituted for the long shackle 18.

This arrangement of plows and mechanism for supporting and raising and lowering them is particularly advantageous in that it can be readily applied to tractors without materially varying the construction of the tractors.

What I claim is:

1. The combination of a tractor chassis including a frame, and a power plant carried by the frame, an implement including a support movably connected to the frame, power transmitting connections between the power plant and the support and operable to raise and lower the support, said connections comprising a crank arm, means connecting the crank arm and the support, means for actuating the crank arm, and means for connecting and disconnecting said power transmitting connections and the power plant at will, substantially as and for the purpose specified.

2. The combination of a tractor chassis including a frame, and a power plant carried by the frame, implements each including a support movably connected to the frame and power transmitting connections between the power plant and the supports operable at will to raise one support and lower the other, said connections comprising a crank arm, means connecting the crank arm to each support, and means for actuating the crank arm into different radial positions, substantially as and for the purpose set forth.

3. The combination of a tractor chassis including a frame and a power plant carried by the frame, implements including supports at opposite ends of the frame and movably connected thereto, means operated at will by the power plant for raising and lowering the supports comprising a shaft having a crank arm thereon, connections between the crank arm and each of the supports, and connections between the shaft and power plant to actuate said shaft and carry the crank arm into different radial positions, substantially as and for the purpose described.

4. The combination of a tractor chassis including a frame, an implement, and means for raising and lowering the implements carried by the frame comprising a shaft and bearings therefor, arms pivotally secured at points spaced apart to the frame and being also secured to said bearings, connections between the shaft and the implement, and means for driving the shaft, substantially as and for the purpose specified.

5. The combination of a tractor chassis including a frame, an implement, and means for raising and lowering the implement carried by the frame comprising a shaft and bearings therefor, arms pivotally secured at points spaced apart to the frame and being also secured to said bearings, connections between the shaft and the implement, and means for driving the shaft, including a casing mounted on the shaft, a driving element supported by the casing and a driven element on the shaft and coacting with the driving element, substantially as and for the purpose described.

6. The combination of a tractor chassis including a frame, an implement, and means for raising and lowering the implements carried by the frame comprising a shaft and bearings therefor, arms pivotally secured at points spaced apart to the frame and being also secured to said bearings, connections between the shaft and the implement, and means for driving the shaft, including a casing mounted on the shaft, a driving element supported by the casing and a driven element on the shaft and coacting with the driving element, and means associated with said arms for engaging the casing, substantially as and for the purpose specified.

In testimony whereof, I have hereunto signed my name, at Syracuse, in the county of Onondaga, and State of New York, this 30th day of September, 1919.

ALEXANDER T. BROWN.